United States Patent [19]
Genzel et al.

[11] Patent Number: 5,643,116
[45] Date of Patent: Jul. 1, 1997

[54] DEVICE FOR DETERMINING BELT ROTATIONAL SPEED OF CONTINUOUSLY VARIABLE TRANSMISSION

[75] Inventors: Michael Genzel, Rosstal; Gerhard Hettich, Dietenhofen; Norbert Ramm, Brunswick, all of Germany

[73] Assignee: Temic Telefunken microelectronic GmbH, Heilbronn, Germany

[21] Appl. No.: 554,238

[22] Filed: Nov. 8, 1995

[30] Foreign Application Priority Data

Nov. 11, 1994 [DE] Germany ............ 44 40 278.3

[51] Int. Cl.$^6$ ................................. F16H 63/42
[52] U.S. Cl. ................ 474/11; 474/18; 474/28; 477/97
[58] Field of Search ............... 474/11, 18, 28, 474/29; 477/97

[56] References Cited

U.S. PATENT DOCUMENTS

| | | | |
|---|---|---|---|
| 3,974,893 | 8/1976 | Conner et al. | 477/97 X |
| 4,364,448 | 12/1982 | Ikuma | 180/206 |
| 4,735,597 | 4/1988 | Cadee | 477/97 X |
| 4,803,628 | 2/1989 | Hayashi et al. | 477/174 X |
| 4,803,900 | 2/1989 | Ohkumo | 477/46 X |
| 5,427,579 | 6/1995 | Kanehara et al. | 474/28 |

FOREIGN PATENT DOCUMENTS

| | | |
|---|---|---|
| 4011724 | 10/1991 | Germany. |
| 4326863 | 2/1994 | Germany. |

*Primary Examiner*—Roger J. Schoeppel
*Attorney, Agent, or Firm*—Spencer & Frank

[57] ABSTRACT

A device is proposed to determine the rotational speed of a transfer element (3) arranged in variable-diameter pulleys (1, 2) of a continuously variable transmission system, the said device Consisting of a sliding stock (4, 15), with a sensor (10, 16) which is supported on the transfer element (3) on the inner sides of the variable-diameter pulleys, which sliding stock is connected to the transmission case (8) by a spring (6) loaded rocker arm (5) mounted in a swivelling joint (7).

With the knowledge of the peripheral speed of the transfer element (3), the rotary speeds (N1, N2) of the set of variable-diameter pulleys (1, 2) and the effective transmission radii (r1, r2), the slippage can be determined between the transfer element (3) and the sets of variable-diameter pulleys (1, 2). By comparing the previously established maximum amounts of slippage with the detected amounts of slippage, the maximum requisite pressure applied by the axially shifting variable-diameter pulley (9) in each set of variable-diameter pulleys (1, 2) can be adjusted to the optimum amount (see FIG. 1).

6 Claims, 1 Drawing Sheet

DEVICE FOR DETERMINING BELT ROTATIONAL SPEED OF CONTINUOUSLY VARIABLE TRANSMISSION

BACKGROUND OF THE INVENTION

The invention relates to a device for determining the rotational speed of a transfer element arranged between two sets of variable-diameter pulleys in the transmission case of a continuously variable transmission system in accordance with the preamble contained in patent claim 1.

Continuously variable transmissions, typically of the type described in DE-OS 42 27 958.8, are equipped with two sets of variable-diameter pulleys, between which a transfer element, such as a chain or steel belt, is arranged. This transfer element serves to transmit the propulsive power generated by the internal combustion engine of a motor vehicle from an input shaft to an output shaft. In order to vary the transmission ratio, and thus the drive torque reaching the vehicle's wheels, it is usual for one variable-diameter pulley of each set of pulleys to be capable of hydraulic displacement on the input or output shaft of the transmission case. As a result of variations in the distance between the pulleys, variations in the effective transfer radii of the transfer element are produced in the respective sets of variable-diameter pulleys. The amount of pressure which is generated between the respective variable-diameter pulleys at a preset distance, and applied to the transfer element for the transmission of power, is dependent on the peripheral force acting on the transfer element and is automatically adjusted by a transmission control system, it usually being necessary to make provision for conditions of uncertainty by clear surplus allowances.

To achieve a satisfactory degree of overall efficiency, or to achieve the minimum loss of power from a transmission system of this type, it is necessary to minimise this applied pressure as far as possible. In addition, provided the pressure required to be applied by the pulleys to the transfer element at any given time is precisely known, the maximum power required from the hydraulic pump for the pulley displacement system can be reduced, thereby not only saving space in the transmission case but also costs.

SUMMARY OF THE INVENTION

The objective of the invention, therefore, is to provide a device with the aid of which the optimum pressure applied by the variable-diameter pulleys to the transfer element can be determined. The means of achieving this objective can be derived from the characteristics described in Patent claim 1. Advantageous embodiments and further developments of the invention can be taken from the secondary claims.

The invention is based on the knowledge that the optimum pressure applied by the variable-diameter pulleys to the transfer element can be indirectly deduced from the slippage of the transfer element between the pairs of pulleys, which can be determined in turn from the difference in speed between the transfer element and the peripheral speed of one variable-diameter pulley at the point at which power is transmitted to the transfer element. With knowledge of the slippage for every operating point, the correct applied pressure can then be adjusted by means of the transmission control system. According to the invention, therefore, a device permitting the measurement of the speed of the transfer element is proposed, whereby a sensor element is secured to a rotary mounted rocker arm, which is pressed against the transfer element under spring force by means of a sliding stock. By means of the said sensor element; interval markings on the transfer element can be detected and its speed thus determined. A sensor of this type may be based on the electromagnetic or optical operating principle, such as a Hall sensor or a photo-sensor.

In another form of embodiment, a V-shaped sliding stock can be attached to the rocker arm, in which a sensor element of the type described above is mounted in turn. In this case, the sliding stock is not supported on the transfer element but on the inner surfaces of the variable-diameter pulleys and is shifted radially by the axial displacement of the said pulleys. In each case, this alternative sliding stock, however, moves in close proximity to the transfer element, so that interval markings on the transfer element can be detected by the sensor. The interval markings can typically take the form of the individual chain links or sections of the steel belt of which the transmission chain or belt forming the transfer element of the transmission is composed.

BRIEF DESCRIPTION OF THE DRAWINGS

To afford a clearer understanding of the invention, the description is accompanied by drawings, with the aid of which the device according to the invention can be explained.

DESCRIPTION OF A PREFERRED EMBODIMENT

Figure 1:
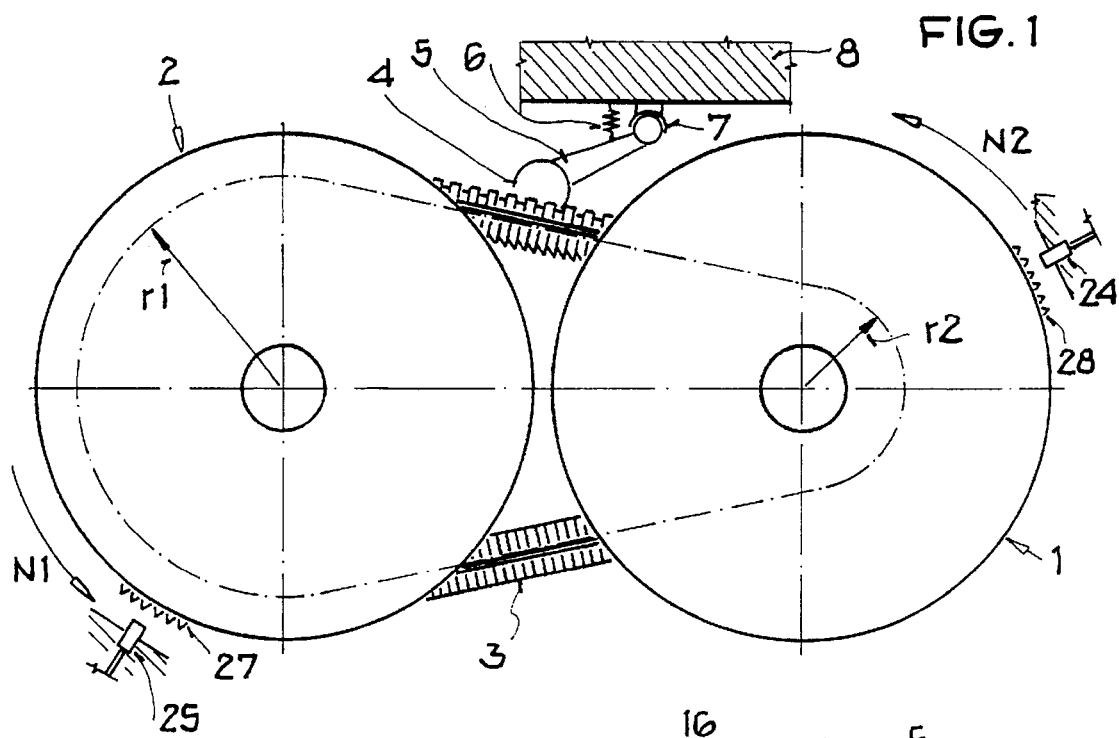
FIG. 1 shows a side view of two variable diameter pulleys.

FIG. 1 shows a side view of two sets of variable-diameter pulleys 1, 2 of the transmission system, which are arranged respectively on a transmission input and output shaft (not shown). Each of the two sets of pulleys consists (in a known manner) of a variable-diameter pulley 21 secured rigidly to the respective transmission shaft and a second variable-diameter pulley 9, mounted to the same shaft but capable of axial displacement (see FIG. 3).

A transfer element 3, which may typically consist of a drive chain or steel belt, is looped around the two sets of variable-diameter pulleys 1, 2. Depending on the axial distance between the pulleys belonging to their respective sets, an effective transmission radius r1, r2 applies to the transfer element 3, whereby variations in the said radii, caused by a hydraulic displacement device acting on the pulleys (not shown), permit the torque and driving rpm transmitted to the drive wheels to be varied accordingly.

Since the transfer element 3 should operate without slippage in order to avoid power losses and to prevent material damage to the transfer element and the inner surfaces of the pulleys, the selected degree of applied pressure under which the axially shifting pulley 9 is forced against the transfer element is always set at such a level that slippage is effectively suppressed to such an extent that, on the one hand, the pulleys and transfer element are assured of a satisfactory service life while, on the other hand, the losses in this transmission area are minimized.

To control the optimum applied pressure for the axially displaced variable-diameter pulley 9 of each set of pulleys 1, 2, information as to the slippage of the transfer element 3 between the two sets of pulleys is determined and minimized in a regulating circuit forming part of the transmission control system. According to the invention, this consists of a device whereby a suitable sensor 10 is secured in sliding stock 4 and is positioned immediately above the transfer element 3 for the purpose of detecting interval markings on the said transfer element. The sliding stock 4 is connected to a rocker arm 5 which is mounted subject to spring 6 force in a swivelling joint 7, which is in turn connected to the transmission case 8.

Figure 2:
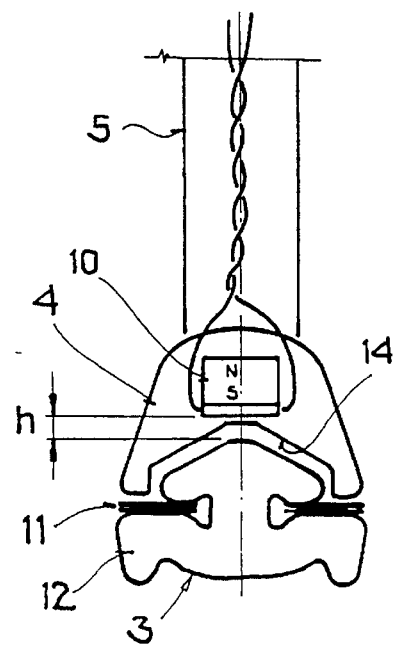
FIG. 2 depicts a cross-section through the sliding stock and sensor.

FIG. 2 depicts a cross section through the sliding stock 4 and the transfer element 3 configured as a steel belt. This belt consists of a number of individual blocks 12 which are clamped between the spring clusters 11 which run continuously along the longitudinal length of the transfer element 3. The sliding stock 4 features an internally recessed profile 14 which corresponds approximately to the geometry of the upper part of the blocks 12 and spring clusters 11 of the transfer element 3. By this means, the sliding elements can run either on the flanks of the upper sections of the said blocks 12 or on the spring clusters 11 of the transfer element 3. A suitable sensor 10 is arranged within the sliding stock 4 for the purpose of identifying markings on the transfer element 3. In their simplest form, these markings can be formed by the tips of the blocks 12 of the transfer element 3 facing the sensor element.

The sensor element 10 can typically consist of a Hall sensor or photo-sensor. In the typical embodiment depicted here, a Hall sensor 10 is shown which is positioned at a distance h from the tip of the blocks 12 of the transfer element 3. Leads (shown here incomplete) from this sensor 10 lead to the transmission control system (not shown) by which the hydraulic pressure for the displacement of the variable-diameter pulleys 9 can be adjusted as a function of the slippage of the transfer element 3.

Figure 3:
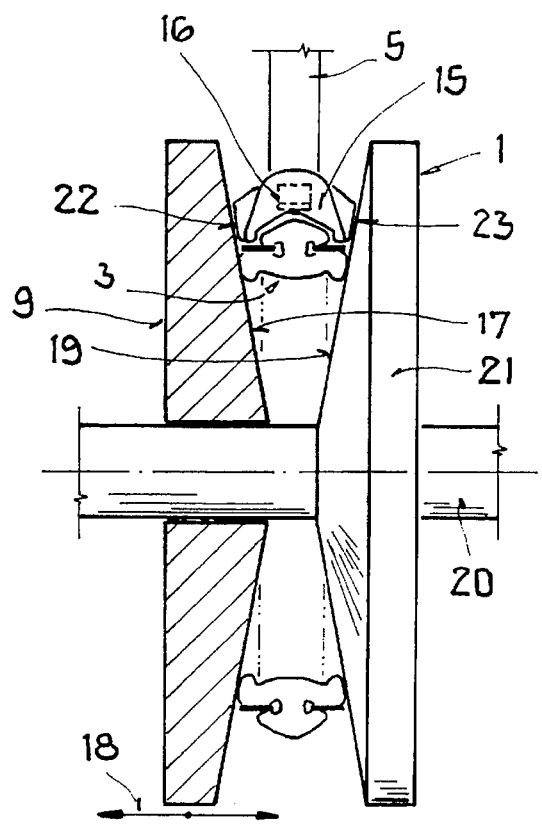
FIG. 3 depicts an alternate embodiment of the sliding stock.

FIG. 3 depicts an alternative form of embodiment of the sliding stock. In this case, the sliding stock 15 is configured as a component of which the outer flanks are supported on the inner walls of the variable-diameter pulleys 17, 19 and is thereby shaped in such a way that the said sliding stock 15 is arranged at the previously specified distance h above the block 12, the position of which is represented only in diagrammatic form. Here again, the sliding stock 15 is provided with a sensor element 16 which is suitable for the detection of interval markings on the transfer element 3. Axial displacement of the variable-diameter pulley 9 (corresponding to the arrows 18) results in the inward or outward radial movement of the transfer element 3, together with the radial movement of the sliding stock 15 on the inner walls 17, 19 of the pulleys 9, 21, while the distance h between the blocks 12 and the sensor 16 is maintained, so that the peripheral speed of the transfer element 3 can be determined at any time.

To enable the transmission control system to determine slippage, it is usually necessary to determine the speed N1, N2 of the variable-diameter pulleys in addition to the peripheral speed of the transfer element 3. This task is performed by rotary speed sensors 24, 25, which identify the markings 27, 28 on the variable-diameter pulleys.

Information obtained by the sensors concerning the peripheral speed of the transfer element 3 and data relating to the rotary speed of the two sets of variable-diameter pulleys 1, 2 are transmitted to the transmission control system and used to calculate slippage between the transfer element and the respective sets of pulleys. By means of a simple kinematic correlation, whereby the slippage of the transfer element 3 is derived from the peripheral speed of the transfer element less the peripheral speed of the effective segment of the variable-diameter pulley (radius r1, r2), the actual slippage in the transmission system can be calculated at any time. Depending on the variation between the amounts of permissible slippage determined by trials and the equivalent stored data, the pressure in the individual pressurizing pistons of the hydraulic positioning system can be readjusted by means of suitable adjusting algorithms. In this way, it is possible to reduce the actuating pressure for the variable-diameter pulley to a level which not only ensures that the transfer element 3 is securely gripped in the sets of variable-diameter pulleys, but also prevents the pump from performing unnecessary work. At the same time, a variable displacement pump (if fitted) can be readjusted with due allowance for other hydraulically operated components in the transmission system.

What is claimed is:

1. Device for determining the rotational speed of a transfer element arranged between two sets of variable-diameter pulleys (1, 2) in the transmission case (8) of a continuously variable transmission system, wherein a sensor (10, 16) is arranged in a sliding stock (4, 15), the said sensor being secured to a spring (6) loaded rocker arm (5) which, together with the spring (6) is itself connected to the transmission case (8) in a swivelling joint (7), whereby the sliding stock (4, 15) is positioned relative to the transfer element (3) in such a way that interval markings along the transfer element (3) can be detected by the sensor (10, 16).

2. Device in accordance with claim 1, wherein the sensor (10, 16) is configured to function electromagnetically or optically, preferably as a Hall sensor or photo-sensor.

3. Device in accordance with claim 2, wherein the sliding stock (4) features an inner recess (14) whereby it is in sliding contact with components (11, 12) of the transfer element (3).

4. Device according to claim 2, wherein the sliding stock (15) is provided with outer contours (22, 23) which serve to support it on the inner sides (17, 19) of the variable-diameter pulleys.

5. Device in accordance with claim 1, wherein the sliding stock (4) features an inner recess (14) whereby it is in sliding contact with components (11, 12) of the transfer element (3).

6. Device according to claim 1, wherein the sliding stock (15) is provided with outer contours (22, 23) which serve to support it on the inner sides (17, 19) of the variable-diameter pulleys.

* * * * *